April 13, 1948.   G. AGINS   2,439,414

SELF-SYNCHRONOUS SIGNALLING SYSTEM

Filed Jan. 26, 1946

INVENTOR
George Agins
BY
Hoguet, Neary & Campbell
ATTORNEYS

Patented Apr. 13, 1948

2,439,414

UNITED STATES PATENT OFFICE 2,439,414

SELF-SYNCHRONOUS SIGNALLING SYSTEM

George Agins, Brooklyn, N. Y., assignor to Arma Corporation, Brooklyn, N. Y., a corporation of New York Application January 26, 1946, Serial No. 643,778

11 Claims. (Cl. 177—311)

This invention relates to self-synchronous electromechanical signaling systems, and has particular reference to an arrangement for indicating unbalance in the electrical circuits of such systems.

It is well known in electromechanical telemetric systems in which a group of self-synchronous angle indicators or receivers follow the angular changes of a similar self-synchronous transmitter by maintenance of an electrically-balanced condition, that the inability of one angle indicator or receiver to follow the transmitter will render inaccurate all the other angle indicators or receivers on the same transmission line. Accordingly, in order to maintain accurate angle reproduction, it is necessary to know when there is interference with the free angular motion of any one of the self-synchronous angle indicators or receivers in the system. In an effort to satisfy this requirement, means responsive to the currents in two of the usual three transmission lines have been arranged to balance when all indicators are following and to light a lamp when one or more fail to follow, but such schemes have not been entirely satisfactory because a considerable lag in following is necessary before a reliable signal is given and by that time the error may have become serious, especially where accurate reproduction is required, such as in making computations.

In accordance with the present invention, a simple arrangement for indicating unbalance in the electrical circuits of a self-synchronous transmission system, due to a lag of a receiver, is provided, which is independent of the angle being transmitted and which produces the maximum signal for any given lag at all orientations.

In its preferred embodiment, the present invention utilizes the well-understood phenomenon of self-synchronous transmission systems that, when a self-synchronous bus line is feeding receivers which are all following freely, there is practically no current flow in any of the three bus-wires, and that when one receiver is constrained the resulting currents in the bus wires are three functions of the angular lag, having usually a three space-phase relation of amplitude with phase agreement of the basic single-phase supply frequency. Such currents add up, algebraically, to zero at any angle of lag and their sum, numerically, is a function of the lag angle. Means are provided between the transmitter and receiver for producing corresponding time-phased currents from such space-phased currents in the three bus wires, and such time-phased currents are added vectorially in suitable means to produce an error-indicating current when there is lag in the transmission and no current when there is no lag, the lag-indicating current being utilized to energize a signal to show that a lag error occurs.

For a more complete understanding of the invention, reference may be had to the accompanying drawings, in which.

Figure 1:
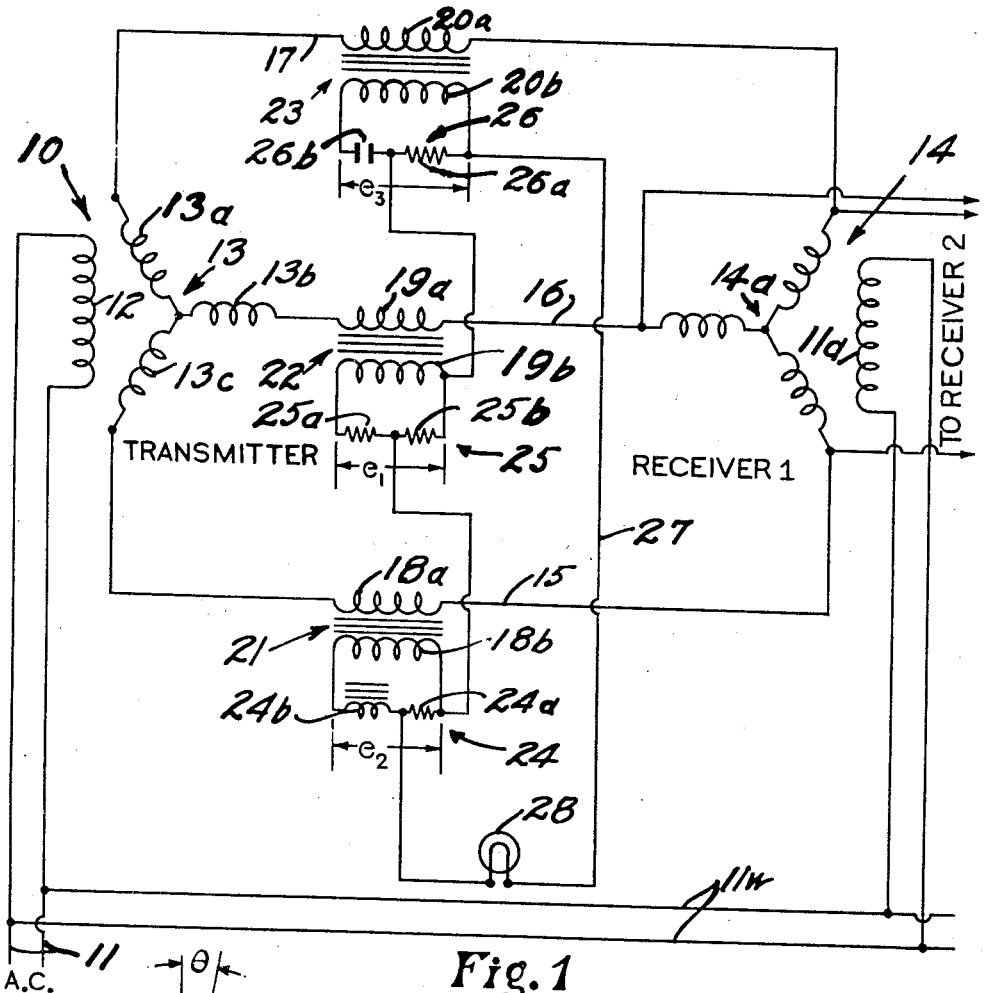
Figure 1 is a circuit diagram of the invention, in which standard parts may be used, as indicated by conventional symbols.

Referring to Fig. 1, numeral 10 designates a self-synchronous electromechanical transmitter having its single phase stator winding 12 supplied from an alternating current source 11, as is usual. The resultant pulsating field interlaces the coils of the three-phase cooperating windings 13a, 13b and 13c, of the relatively movable rotor unit 13, inducing in them three related voltages forming a pattern which is peculiar to the angular relation of the three-phase rotor unit 13 to the single-phase stator unit 12, as is well understood, one set of such values being shown in Fig. 2 as $e_1$, $e_2$, and $e_3$. The windings of the rotor 14a of a corresponding self-synchronous electromagnetic receiver 14, adapted for remote indication of the angle of the transmitter 10, are connected to the windings 13c, 13b and 13a of the latter by the respective bus wires 15, 16 and 17, whereas the single phase stator winding 11a is connected by wires 11w to the alternating current source 11.

With such an arrangement, the rotor 14a of the receiver 14 will turn until it produces a group of voltages equal and opposite to those produced by transmitter 10, so that no currents will flow in any of the wires 15, 16 and 17. However, if the rotor 14a of receiver 14 is forcibly held out of synchronism, then the group of voltages from unit 14 does not agree with the group from unit 10 and currents flow in the leads 15, 16 and 17. Such current flow is, of course, an indication of failure of the transmission system, and this current has been used to operate a suitable error indicator, but since the currents are functions of the angular error, a considerable angular error must exist before any warning signal is given.

The system of the present invention contains additional parts so arranged that the old relation between the currents in the wires 15, 16 and 17 and the angular error obtains, but, ideally, a maximum signal is given immediately that there is even a small angular error between a receiver and the transmitter. The additional parts include the primary windings 18a, 19a and 20a of transformers 21, 22 and 23, inserted in each of the wires 15, 16 and 17, the secondary windings 18b, 19b and 20b of these transformers feeding the currents induced in them into respective phase-controlling networks 24, 25 and 26. Portions of these networks are connected in series in a circuit 27 containing the synchronism error indicator 28, which may be a lamp, as shown, or an equivalent visual or audible signal device, or both.

The network 25 for transformer 22 comprises two non-inductive resistances 25a and 25b, as shown, with the output terminal of this network at their junction. The network 24 for transformer 21 comprises a non-inductive resistance 24a and an inductance 24b in series, with the output terminal of this network located at their junction. The network 26 for transformer 23 comprises a non-inductive resistance 26a in series with a condenser 26b, with the output terminal of this network at their junction. Three non-inductive resistances in each network, viz., 24a, 25b, and 26a, are connected in series as shown and with lamp 28 by wire 27. Also, all of the reactances are so proportioned in the networks that three currents are produced in the lamp 28 which are displaced in phase 120° from each other, in time.

In operation of the error-indicating arrangement of this invention as shown in Fig. 1, when any currents flow in the wires 15, 16 and 17, due to angular disagreement between transmitter 10 and receiver 14, or any other receiver on the same circuit, voltages are induced across the corresponding networks 24, 25 and 26. Thus, a voltage $e_1 = E \cos \theta$, is induced across network 25, a voltage $e_2 = E \cos (\theta + 120°)$, is induced across network 24 and a voltage $e_3 = E \cos (\theta + 240°)$, is induced across network 26, where E is the maximum possible voltage across any transformer secondary winding for a given lag angle of the receiver, as $\theta$ varies between 0° and 360°, and $\theta$ is the angular position of the rotor of the transmitter with respect to its position where $e_1$ is a maximum ($=E$). These voltage values $e_1$, $e_2$, and $e_3$, indicated in Fig. 1, are those graphically shown and so designated in Fig. 2.

Referring again to network 25, it will be observed that since it has only resistance, it gives a voltage $$e_1^1$$

output to the lamp circuit which is proportional to the voltage fed to it by transformer 22, i. e., an in-phase voltage. The values of resistance and inductance in network 24 are chosen so that the voltage across resistance 24a lags that received from transformer 21 by 60°. By proper connection of the leads to resistance 24a this voltage can be caused to lag by 180°+60°=240°. Similarly the values of resistance and capacitance in network 26 are chosen so that the voltage across resistance 26a leads that received from transformer 23 by 60°. By proper connection of the leads to resistance 26a this voltage can be caused to lag by 180°−60°=120°. These voltages in the lamp circuit 27 are all added to produce a voltage equal to 3/4E, which voltage is independent of the angle $\theta$ being transmitted.

Considered mathematically:

E is the maximum possible voltage across any transformer secondary winding for a given lag angle of the receiver, as $\theta$ varies between 0° and 360°.

$\theta$ is the angular position of the rotor of the transmitter with respect to its position where $e_1$ is maximum ($=E$)

$e_1$ is the voltage across network 25

$e_2$ is the voltage across network 24

$e_3$ is the voltage across network 26

$e'_1$ is the in-phase (with $e_1$) component of the voltage across resistance 25b $e'_2$ is the in-phase (with $e_2$) component of the voltage across resistance 24a $e'_3$ is the in-phase (with $e_3$) component of the voltage across resistance 26a $e''_1$ is the quadrature (with $e_1$) component of the voltage across resistance 25b $e''_2$ is the quadrature (with $e_2$) component of the voltage across resistance 24a $e''_3$ is the quadrature (with $e_3$) component of the voltage across resistance 26a Then:

$$e_1 = E \cos \theta$$

$$e_2 = E \cos (\theta + 120°) = E \cos \theta \cos 120° - E \sin \theta \sin 120° = -\tfrac{1}{2} E \cos \theta - \tfrac{\sqrt{3}}{2} E \sin \theta$$

$$e_3 = E \cos (\theta + 240°) = E \cos \theta \cos 240° - E \sin \theta \sin 240° = -\tfrac{1}{2} E \cos \theta + \tfrac{\sqrt{3}}{2} E \sin \theta$$

*In-phase component voltages*

$$e'_1 = \tfrac{1}{2} e_1 = \tfrac{1}{2} E \cos \theta$$

$$e'_2 = -\tfrac{1}{4} e_2 = \tfrac{1}{8} E \cos \theta + \tfrac{\sqrt{3}}{8} E \sin \theta$$

$$e'_3 = -\tfrac{1}{4} e_3 = \tfrac{1}{8} E \cos \theta - \tfrac{\sqrt{3}}{8} E \sin \theta$$

*Sum of in-phase component voltages*

$$e'_1 + e'_2 + e'_3 = \tfrac{3}{4} E \cos \theta$$

*Quadrature component voltages*

$$e''_1 = 0$$

$$e''_2 = \tfrac{\sqrt{3}}{4} e_2 = -\tfrac{\sqrt{3}}{8} E \cos \theta - \tfrac{3}{8} E \sin \theta$$

$$e''_3 = -\tfrac{\sqrt{3}}{4} e_3 = \tfrac{\sqrt{3}}{8} E \cos \theta - \tfrac{3}{8} E \sin \theta$$

*Sum of quadrature component voltages*
$$e''_1 + e''_2 + e''_3 = -\tfrac{3}{4} E \sin \theta$$

*Vector sum of the in-phase and quadrature component voltages (square root of the sum of the squares)*

$$\sqrt{(\tfrac{3}{4} E \cos \theta)^2 + (-\tfrac{3}{4} E \sin \theta)^2} = \sqrt{\tfrac{9}{16} E^2 (\cos^2 \theta + \sin^2 \theta)} = \sqrt{\tfrac{9}{16} E^2} = \tfrac{3}{4} E$$

It will be observed that the 3/4E voltage applied to lamp 28 does not contain any function of $\theta$, the angle being transmitted, but depends on the value of the lag angle of the receiver.

Figure 2:
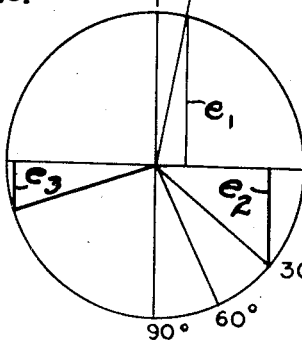
Fig. 2 is a vector diagram for use in explanation of the action of the invention; and, Fig. 3 is a wave diagram, corresponding to Fig. 2.
Figure 3:
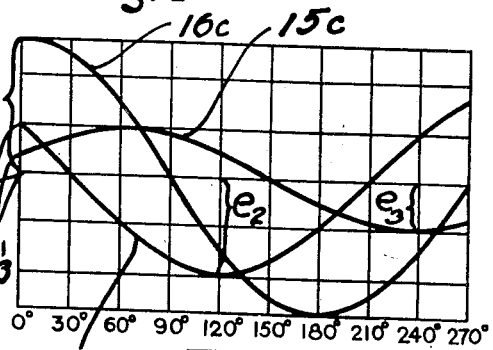

Fig. 3 illustrates the values shown space-phased in Fig. 2 as ordinates $e_1$, $e_2$, and $e_3$ representing the magnitude of single phase alternating current, which are graphically illustrated as having been thrown out of time-phase by the various networks 24, 25 and 26 of Fig. 1. Thus, curve 16C is not displaced because network 25 has neither inductance nor capacitance; curve 17C is shown as displaced 120° from curve 16C, whereas curve 15C is shown as spaced 240° from the resultant instantaneous values adding up to the value $$\frac{3E}{4}$$

as was mathematically demonstrated above.

Although a preferred embodiment of the invention for indicating loss of synchronism between the transmitter and a receiver of a self-synchronous transmission system has been illustrated and described herein, it is to be understood that the invention is not limited thereby, but is susceptible of changes in form and detail within the scope of the appended claims.

I claim:

1. In an electrical self-synchronous transmission system wherein an electromechanical transmitter is connected by at least two wires to and drives at least one similar electromagnetic receiver and wherein lag between transmitter and receiver causes currents to flow in the said wires which are in multi-space-phase relation, the combination of phase controlling electrical means including non-inductive resistances interposed in said wires between said transmitter and receiver responsive to said space-phased currents for producing corresponding time-phased currents, means severally connected to said non-inductive resistances for adding said time-phased electric currents vectorially, whereby a current is produced in said second means only when there is lag in the transmission and is substantially unaffected in magnitude by the magnitude of the angle being transmitted, and means connected to said second means for indicating the existence of said current as a warning signal of said lag.

2. In an electrical self-synchronous transmission system wherein an electromechanical transmitter is connected by at least two wires to and drives at least one similar electromagnetic receiver and wherein lag between transmitter and receiver causes currents to flow in the said wires which are in multi-space-phase relation, the combination of phase controlling electrical means including non-inductive resistances interposed in said wires between said transmitter and receiver responsive to said space-phased currents for producing corresponding time-phased currents, means severally connected to said non-inductive resistances in series for adding said time-phased electric currents vectorially, whereby a current is produced in said second means only when there is lag in the transmission and is substantially unaffected in magnitude by the magnitude of the angle being transmitted, and means connected to said second means for indicating the existence of said current as a warning signal of said lag.

3. In an electrical self-synchronous transmission system wherein an electromechanical transmitter is connected by at least two wires to and drives at least one similar electromagnetic receiver and wherein lag between transmitter and receiver causes currents to flow in the said wires which are in multi-space-phase relation, the combination of transformer means interposed in said wires between said transmitter and receiver responsive to said space-phased currents for inducing in the respective secondary windings corresponding currents, phase controlling electrical means connected to said secondary windings and including non-inductive resistances, and means severally connecting said non-inductive resistances in series for adding said time-phased electric currents vectorially, whereby a current is produced in said second means only when there is lag in the transmission and is substantially unaffected in magnitude by the magnitude of the angle being transmitted, and means connected to said second means for indicating the existence of said current as a warning signal of said lag.

4. In an electrical self-synchronous transmission system wherein an electromechanical transmitter is connected by at least two wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings and each including a non-inductive resistance, means connecting said network resistances in series to vectorially add the time-phased currents produced in the corresponding networks, and an indicator interposed in said series connection and responsive to the existence of any composite current for indicating the lag causing such current.

5. In an electrical self-synchronous transmission system wherein an electromechanical transmitter is connected by at least two wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings, one of said networks including a non-inductive resistance and an inductance and another of said networks including a non-inductive resistance, means connecting said network resistances in series to vectorially add the time-phased currents produced in the corresponding networks, and an indicator interposed in said series connection and responsive to the existence of any composite current for indicating the lag causing such current.

6. In an electrical self-synchronous transmission system wherein an electromechanical transmitter is connected by at least two wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings, one of said networks including a non-inductive resistance and a capacity and another of said networks including a non-inductive resistance, means connecting said network resistances in series to vectorially add the time-phased currents produced in the corresponding networks, and an indicator interposed in said series connection and responsive to the existence of any composite current for indicating the lag causing such current.

7. In an electrical self-synchronous transmission system wherein an electromechanical transmitter is connected by at least two wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings, one of said networks including a non-inductive resistance and an inductance and the other of said networks including a non-inductive resistance and a capacity, means connecting said network resistances in series to vectorially add the time-phased currents produced in the corresponding networks, and an indicator interposed in said series connection and responsive to the existence of any composite current for indicating the lag causing such current.

8. In an electrical self-synchronous transmission system wherein an electromechanical transmitter is connected by at least two wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings, each of said networks including a non-inductive resistance and one of said networks including a reactance, means connecting said network resistances in series to vectorially add the time-phased currents produced in the corresponding networks, and an indicator interposed in said series connection and responsive to the existence of any composite current for indicating the lag causing such current.

9. In an electrical self-synchronous transmission system wherein an electromechanical transmitter is connected by three wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings and each including a non-inductive resistance, means connecting said network resistances in series to vectorially add the time-phased currents produced in the corresponding networks, and an indicator interposed in said series connection and responsive to the existence of any composite current for indicating the lag causing such current.

10. In an electrical self-synchronous transmission system wherein an electromechanical transmitter is connected by three wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings, each of said networks including a non-inductive resistance and at least two of said networks including reactances so proportioned that the time-phased currents produced in the three networks are displaced 120° in phase from each other, means connecting said network resistances in series to vectorially add the time-phased currents produced in the corresponding networks, and an indicator interposed in said series connection and responsive to the existence of any composite current for indicating the lag causing such current.

11. In an electrical self-synchronous transmission system wherein an electromechanical transmitter is connected by three wires to and drives at least one similar electromagnetic receiver and wherein lag between transmitter and receiver causes current to flow in the said wires which are in multi-space-phase relation, the combination of a transformer primary winding interposed in each of said wires responsive to said corresponding space-phased currents, phase-controlling electrical networks connected to the corresponding transformer secondary windings, one of said networks including a pair of resistances in series, at least one of which is a non-inductive resistance, another of said networks including a capacity and a non-inductive resistance in series, the third of said networks including an inductance and a non-inductive resistance in series, the components of each of said networks having their respective output terminals at their junction point, means connecting said output terminals in series to connect said network resistances in series to vectorially add the time-phased currents produced in the corresponding networks, and an indicator interposed in said series connection and responsive to the existence of any composite current for indicating the lag causing such current.

GEORGE AGINS.

REFERENCES CITED

The following references are of record in the file of this patent:

UNITED STATES PATENTS

| Number | Name | Date |
|---|---|---|
| 1,576,189 | Hewlett et al. | Mar. 9, 1926 |
| 2,388,977 | Johnson | Nov. 13, 1945 |